(12) United States Patent
Zoppas et al.

(10) Patent No.: US 11,707,874 B2
(45) Date of Patent: Jul. 25, 2023

(54) APPARATUS FOR COOLING AND HANDLING PREFORMS IN PLASTIC MATERIAL

(71) Applicant: S.I.P.A. Societa' Industrializzazione Progettazione E Automazione S.P.A., Vittorio Veneto (IT)

(72) Inventors: Matteo Zoppas, Conegliano (IT); Massimo Coran, Spresiano (IT); Marco Frare, San Fior (IT)

(73) Assignee: S.I.P.A SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 699 days.

(21) Appl. No.: 16/335,847

(22) PCT Filed: Sep. 22, 2017

(86) PCT No.: PCT/EP2017/074143
§ 371 (c)(1),
(2) Date: Mar. 22, 2019

(87) PCT Pub. No.: WO2018/055142
PCT Pub. Date: Mar. 29, 2018

(65) Prior Publication Data
US 2020/0061895 A1    Feb. 27, 2020

(30) Foreign Application Priority Data
Sep. 23, 2016   (IT) .................. 102016000095904

(51) Int. Cl.
*B29C 45/72*   (2006.01)
*B29C 45/42*   (2006.01)
(Continued)

(52) U.S. Cl.
CPC ...... *B29C 45/7207* (2013.01); *B29C 45/4225* (2013.01); *B29C 49/06* (2013.01);
(Continued)

(58) Field of Classification Search
None
See application file for complete search history.

(56) References Cited

U.S. PATENT DOCUMENTS

| 5,232,641 | A   | * | 8/1993 | Williamson | ........ B29C 37/0007 264/237 |
| 2006/0138696 | A1 | * | 6/2006 | Weinmann | .......... B29C 45/7207 264/237 |

(Continued)

FOREIGN PATENT DOCUMENTS

| CN | 1817606 A | 8/2006 |
| CN | 101137479 A | 3/2008 |

(Continued)

OTHER PUBLICATIONS

Telin, What's the Difference Between Rotary and Linear Motion in a Control Valve, 2015, Crane Engineering. (Year: 2015).*

*Primary Examiner* — Armand Melendez
(74) *Attorney, Agent, or Firm* — Stetina Brunda Garred & Brucker

(57) ABSTRACT

An apparatus (1) for handling and cooling plastic preforms comprising a rotatable handling station (2), provided with a plurality of retaining and cooling pins (3) for preforms and adapted to cooperate with an extraction plate (4) adapted to extract the preforms from an injection mold; an aeraulic circuit (5) connected to said station and comprising an aspiration duct (6) for aspirating air from the inside of the station; a delivery duct (7) for sending air to said station; cooling means (8) arranged along the delivery duct for cooling the air sent to said station; aspiration means (9, 19, 29) connected at least to the aspiration duct and to the (Continued)

delivery duct, and wherein switching means are further provided, to pass from a first circuit configuration, in which there is an air passage from the delivery duct to the inside of the station, to a second circuit configuration in which there is an air passage from the inside of the station to the aspiration duct, whereby, in the first configuration, air is blown by means of the plurality of pins, while, in the second configuration, air is aspirated by means of said plurality of pins.

9 Claims, 12 Drawing Sheets

(51) Int. Cl.
| | |
|---|---|
| B29C 49/06 | (2006.01) |
| B29C 49/64 | (2006.01) |
| B60H 1/00 | (2006.01) |
| F27D 17/00 | (2006.01) |
| B29K 101/12 | (2006.01) |
| B29L 31/00 | (2006.01) |
| B60H 1/32 | (2006.01) |

(52) U.S. Cl.
CPC ..... *B29C 49/6427* (2013.01); *B60H 1/00642* (2013.01); *F27D 17/004* (2013.01); *B29C 2045/725* (2013.01); *B29C 2045/7228* (2013.01); *B29C 2045/7257* (2013.01); *B29K 2101/12* (2013.01); *B29L 2031/7158* (2013.01); *B60H 2001/3291* (2013.01); *B60H 2001/3298* (2013.01); *F25B 2309/006* (2013.01)

(56) References Cited

U.S. PATENT DOCUMENTS

| | | | |
|---|---|---|---|
| 2008/0089972 A1* | 4/2008 | Ansari | ............... B29C 45/7207 |
| | | | 425/445 |
| 2011/0089615 A1 | 4/2011 | Bock | |
| 2014/0255535 A1 | 9/2014 | Schad | |

FOREIGN PATENT DOCUMENTS

| | | |
|---|---|---|
| CN | 103153568 A | 6/2013 |
| DE | 19848837 | 4/2000 |
| EP | 0158105 | 10/1985 |
| WO | WO0029132 | 5/2000 |

* cited by examiner

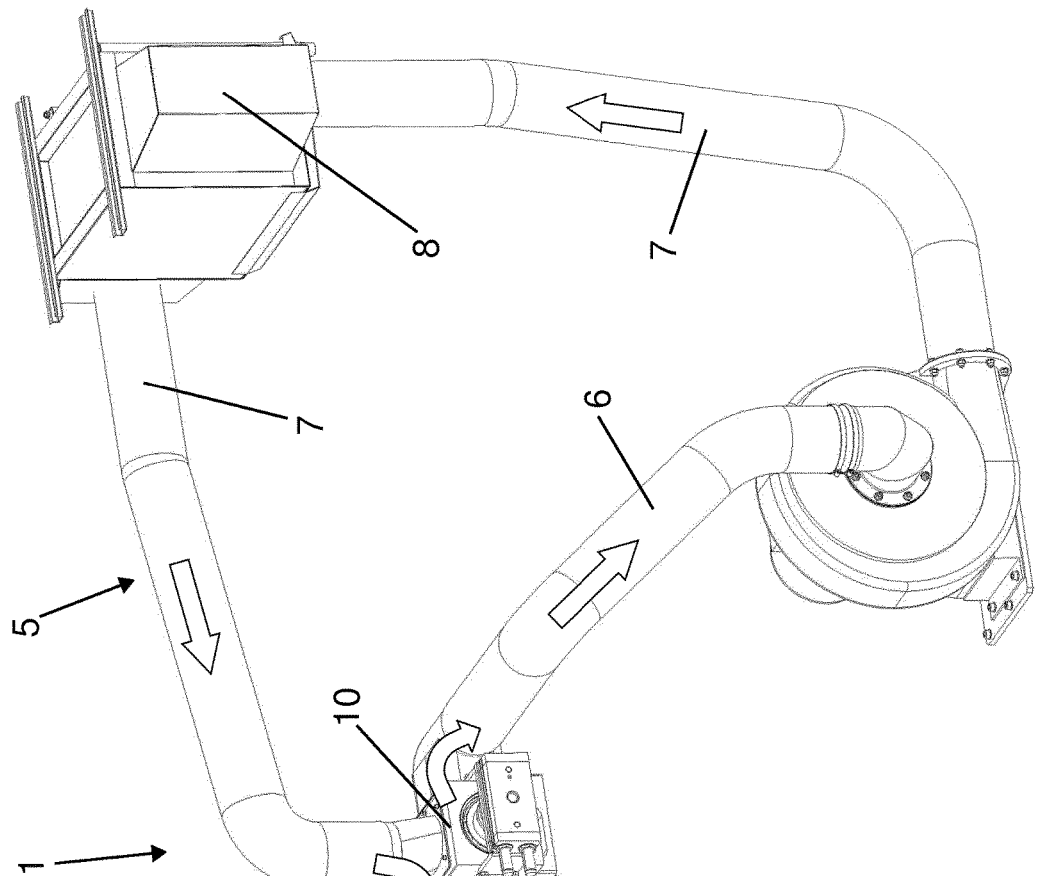
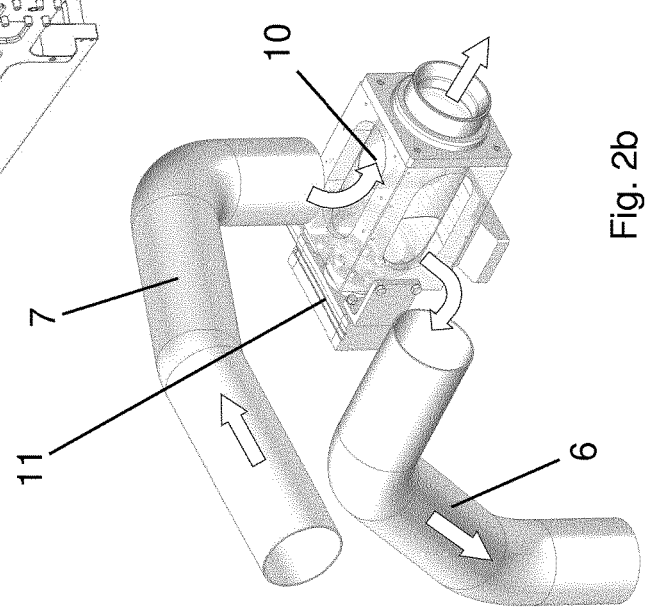
Fig. 2a
Fig. 2b

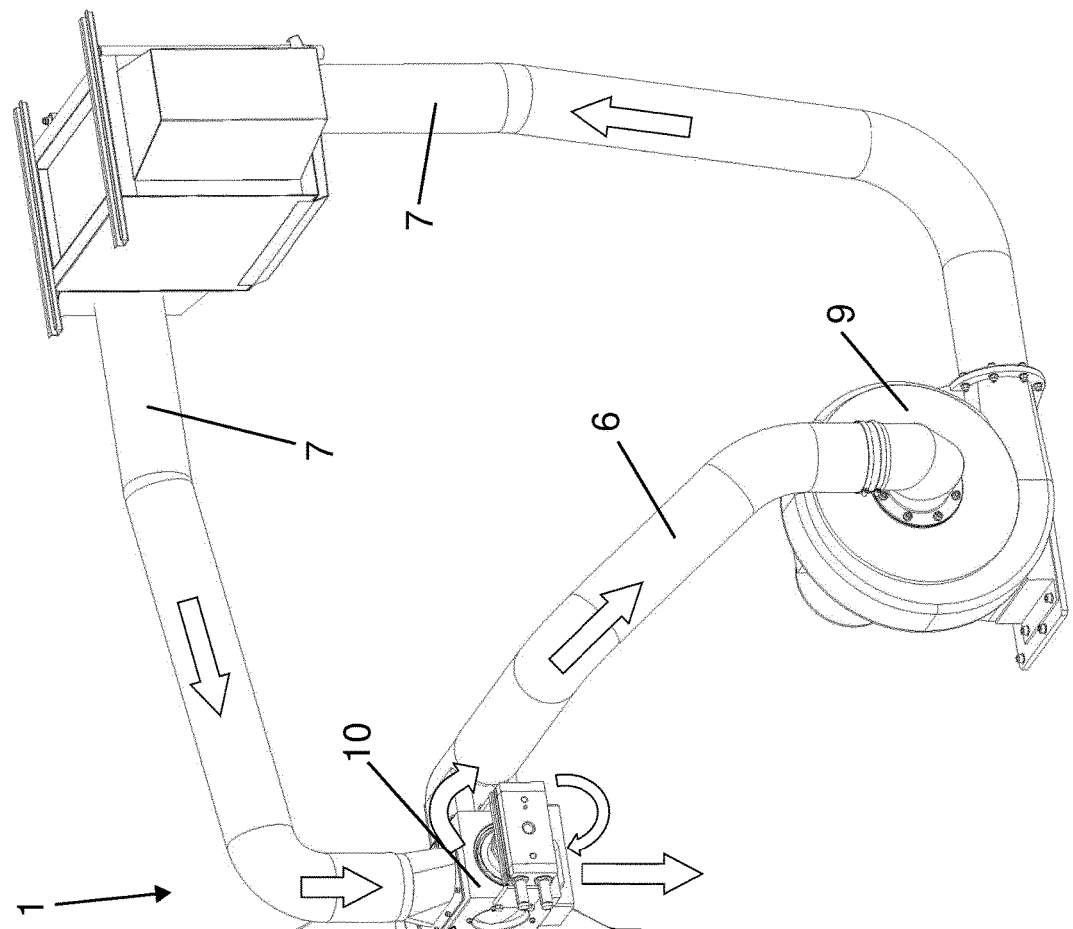
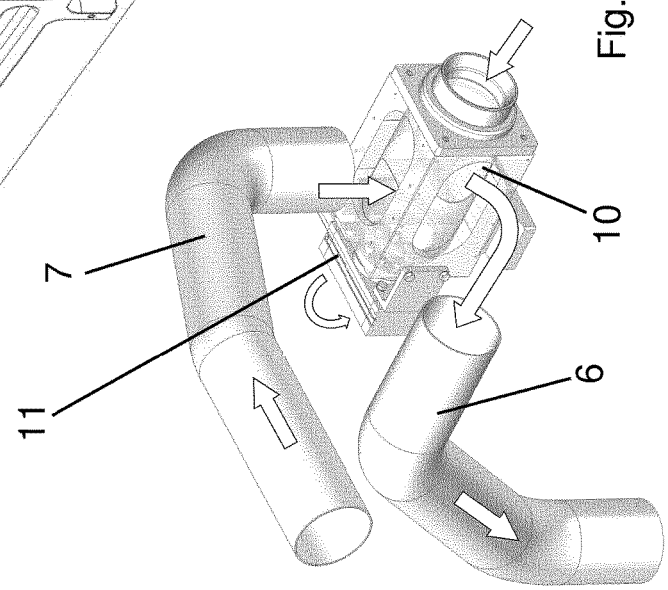
Fig. 3a
Fig. 3b

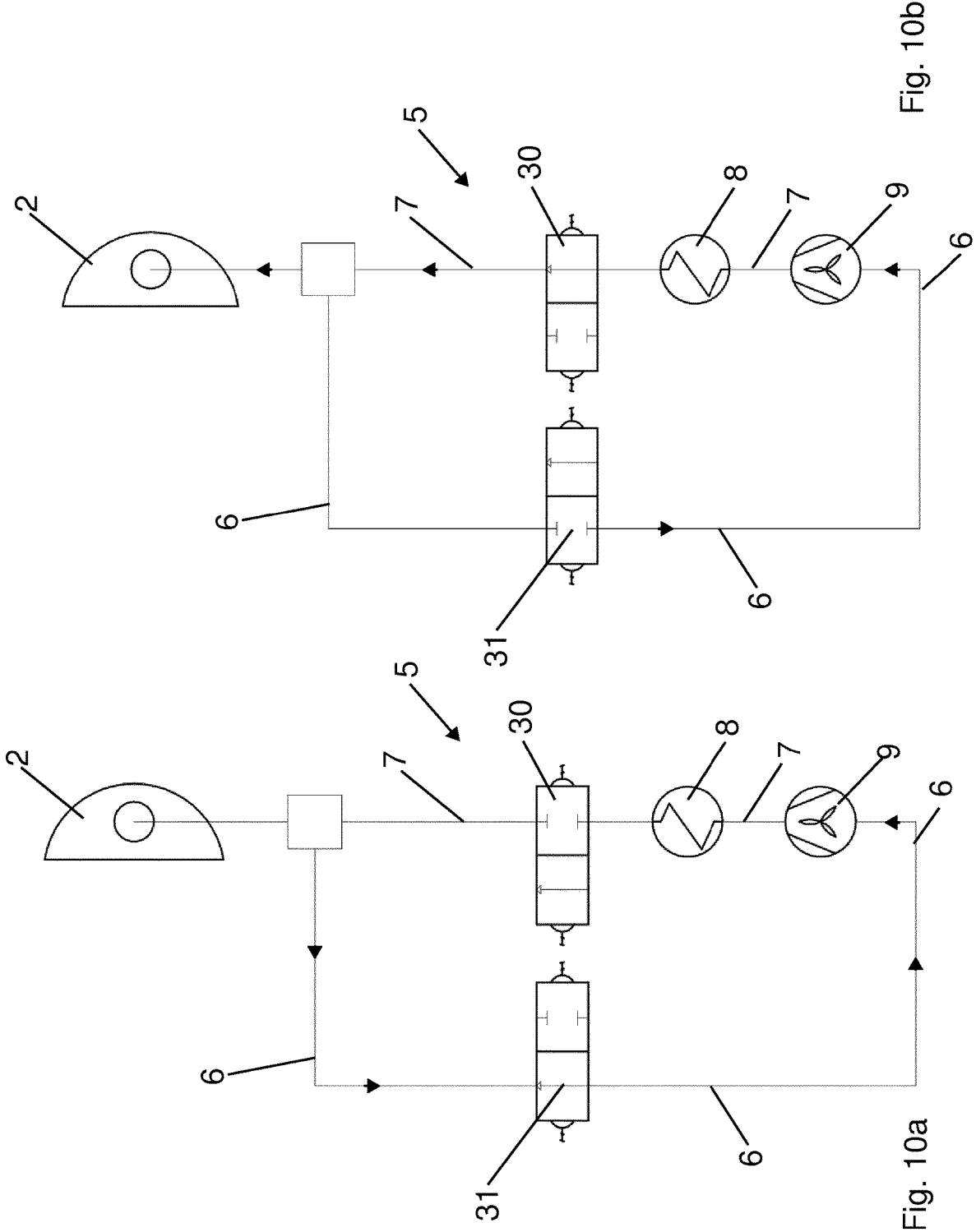

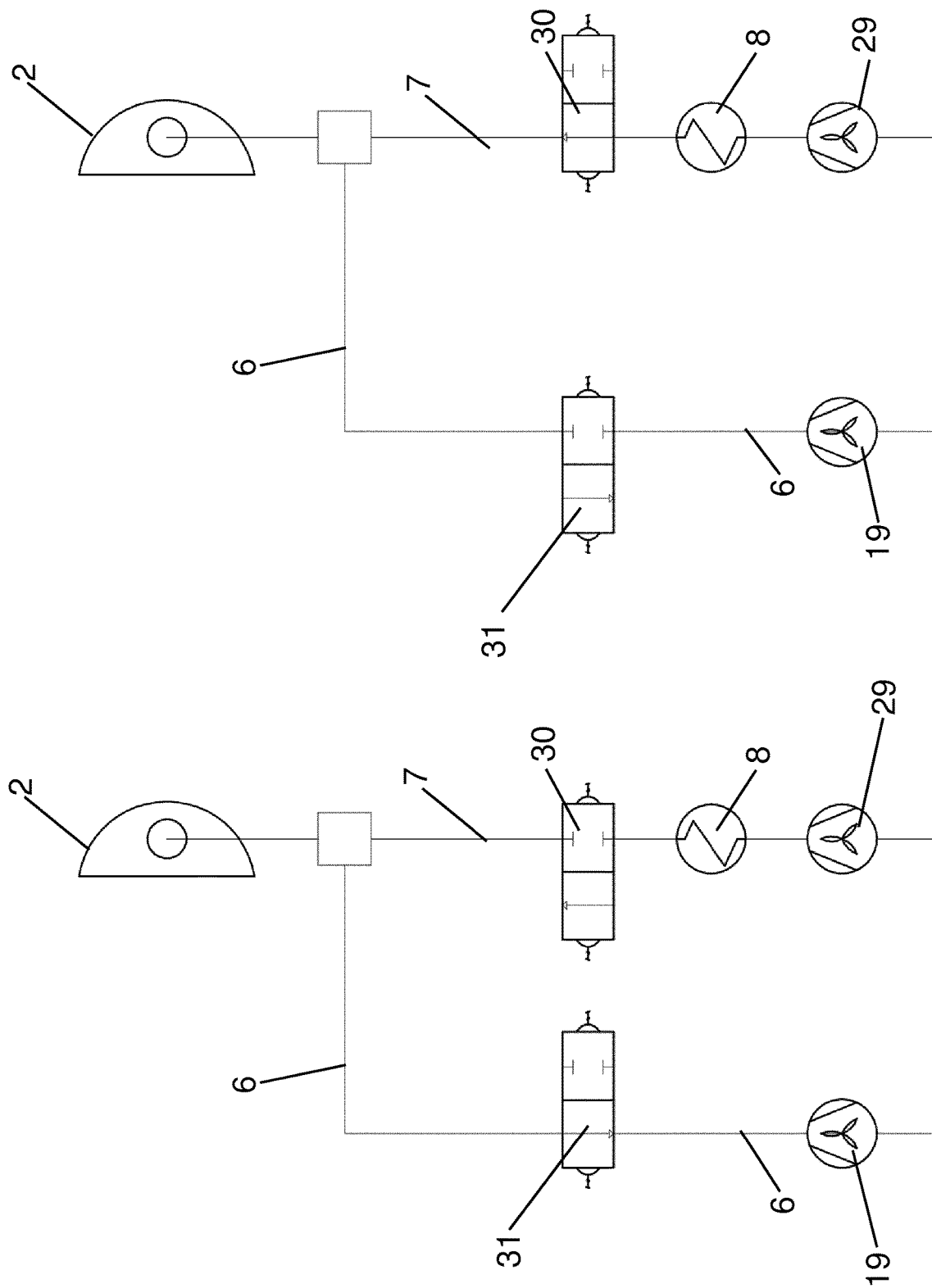

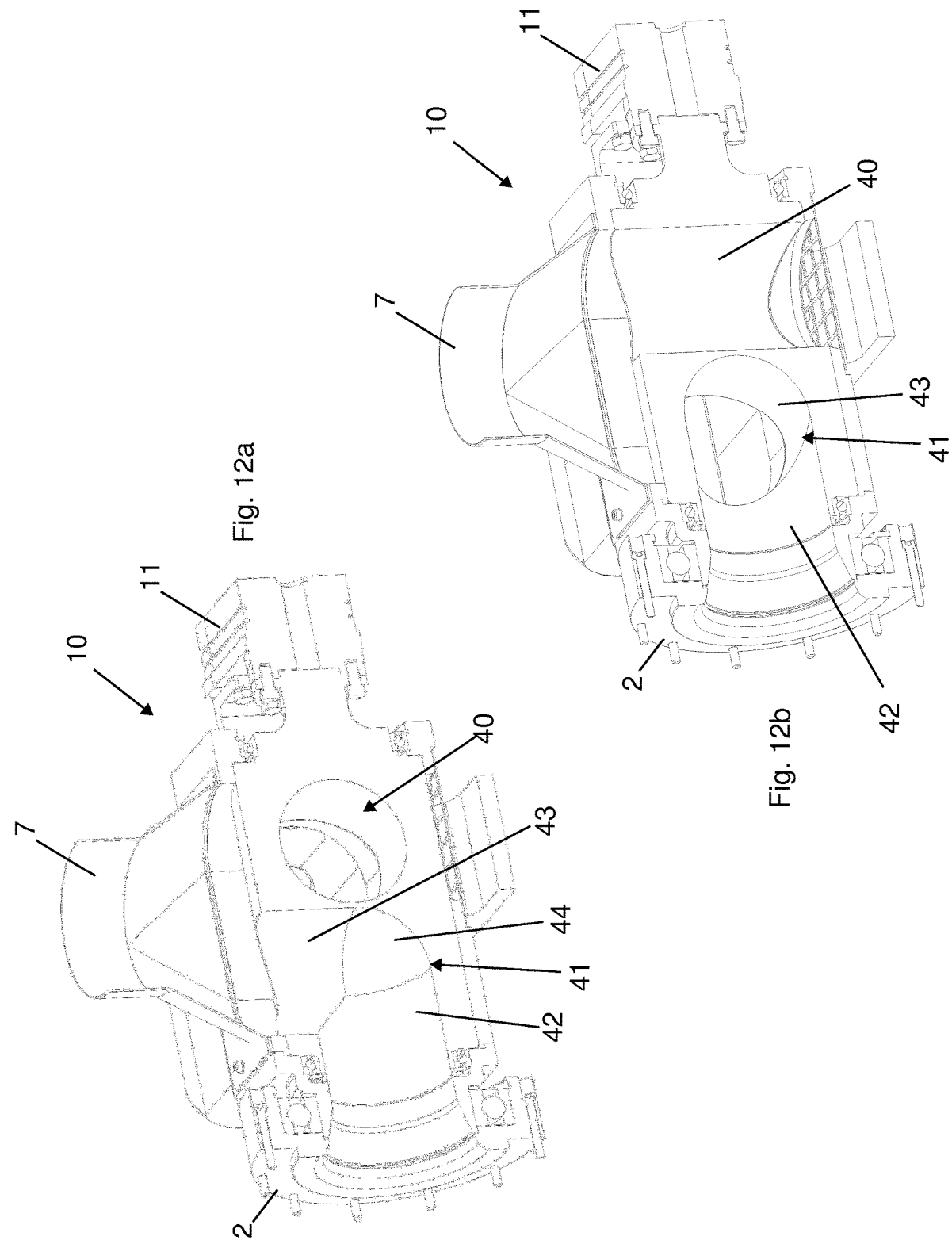

APPARATUS FOR COOLING AND HANDLING PREFORMS IN PLASTIC MATERIAL

CROSS REFERENCE TO RELATED APPLICATION(S)

The present application claims priority to PCT International Application No. PCT/EP2017/074143 filed on Sep. 22, 2017, which application claims priority to Italian Patent Application Nos. 102016000095904 filed Sep. 23, 2016, the entirety of the disclosures of which are expressly incorporated herein by reference.

STATEMENT RE: FEDERALLY SPONSORED RESEARCH/DEVELOPMENT

Not Applicable.

FIELD OF THE APPLICATION

The present invention relates to an apparatus for cooling and handling preforms in plastic material, suitable, in particular, both for completing the cooling of preforms just molded and extracted from an injection mold by means of a plate or take-out device, and for extracting preforms cooled by said take-out device or by another intermediate retaining device. Such preforms are intended to be subsequently converted into containers, in particular, bottles or jars, by means of a blow-molding or stretch blow-molding process. The present invention also relates to an injection molding machine which includes said apparatus and to a relative process for handling and cooling preforms.

PRIOR ART

Preforms are semi-finished products made of thermoplastic material, used for the manufacturing of containers obtained, in turn, by means of a subsequent blow-molding or stretch blow-molding process. Preforms are obtained by means of different processes, for example, by means of injection molding, injection-compression molding or extrusion combined with further hot forming operations. In the production of containers made of plastic material, such as, for example, bottles, preforms are typically obtained by means of injection molding with molds provided with a plurality of molding cavities.

Generally, the step that involves the major time expenditure of most injection molding processes is the step of cooling the molded items. Said cooling step occurs inside the mold, and more precisely inside the molding cavities, until the molded items are not sufficiently rigid to be extracted from the mold itself and, subsequently, handled and transported. Clearly, until the molded items are not sufficiently cooled, and thus solidified, it will not be possible to free the mold cavities and continue the production cycle with a new molding step. Therefore, to reduce the time of an entire molding cycle, and thus increase the productivity of the molding station, different devices have been developed capable of performing at least one part of the cooling of the preforms outside the injection mold.

The systems for withdrawing preforms from injection molds are now provided with a cooling circuit. Said cooling circuit allows to decrease the production cycle time as already described above; in fact, if the withdrawing system is equipped with a cooling circuit, it is possible to reduce the time the preforms are to be kept inside the injection mold. Such withdrawing systems generally comprise a preform extraction plate, suitable for extracting the preforms from the injection mold and, at the same time, cooling them for a predetermined time, and this by means of the circulation of suitable fluids inside the extraction plate itself.

Such extraction plate, also known as a "post-mold device" or "take-out plate" or "end-of-arm tool" (EOAT), is provided with a plurality of cooling housings, also known as shorts, but also known as "cooling tubes", "take-out tubes" or "cooling sleeves".

Whatever the method and the device for the extraction from the injection mold, the cooling of the molded preforms, started in the molding cavities of the mold, continues in the extraction plate cooling housings.

Downstream of the extraction plate, at least one further cooling and handling apparatus is provided, cooperating upstream with said extraction plate and downstream with other components of the production plant.

However, the cooling and handling apparatuses of the prior art are not very efficient. Some of them, for the further cooling, use air aspirated from the inside of the injection molding machine casing. Therefore, the air used for this cooling is quite hot, usually at a temperature of 30-35° C., not ensuring optimal cooling. A known example of such apparatuses uses a rotatable handling station, also known as "rotary shell", which exclusively works by aspirating, both for the cooling step and for the step of retaining and extracting the preforms from the extraction plate. Working by aspirating in the further preforms cooling step involves that the hot air of the casing is aspirated directly inside the preforms to then pass inside the "rotary shell" after going through the respective pin of the rotatable handling station.

Therefore, the cooling and handling apparatuses of the prior art do not allow to meet the current market needs that require further optimization of the preforms cooling times and, hence, the injection molding cycle time, while ensuring the high quality of the preforms for the perfect molding of the blown-molded containers.

Therefore, the need to achieve a preforms cooling and handling apparatus allowing to overcome the aforesaid drawbacks is felt.

SUMMARY OF THE INVENTION

It is a major object of the present invention to achieve a preforms cooling and handling apparatus which allows for a more efficient cooling with respect to the known apparatuses.

Another object of the invention is to achieve a more efficient process for cooling and handling preforms by means of an injection molding machine which includes the aforesaid apparatus.

The present invention, therefore, aims at meeting the above mentioned objects by achieving an apparatus for cooling and handling plastic preforms which, in accordance with claim 1, comprises a rotatable handling station, provided with a plurality of pins for retaining and cooling preforms and adapted to cooperate with an extraction plate adapted to extract the preforms from an injection mold;

an aeraulic circuit connected to said rotatable handling station;

in which said aeraulic circuit comprises an aspiration duct for aspirating air from the inside of the rotatable handling station;

a delivery duct for sending air to said rotatable handling station;

cooling means arranged along said delivery duct for cooling the air sent to said rotatable handling station;
aspiration means connected to said aspiration duct and to said delivery duct, and in which switching means of the aeraulic circuit are further provided, to pass from a first circuit configuration, in which an air passage is possible from the delivery duct to the rotatable handling station, to a second circuit configuration, in which an air passage is possible from the rotatable handling station to the aspiration duct, whereby, in the first circuit configuration, air can be blown by means of the plurality of retaining and cooling pins, while, in the second circuit configuration, air can be aspirated by means of said plurality of retaining and cooling pins.

Another aspect of the invention relates to an injection molding machine which, in accordance with claim 11, comprises a casing inside of which there are provided
at least one injection mold comprising a plurality of molding cavities;
at least one extraction plate comprising at least one set of cooling housings, adapted to receive and retain at least one set of preforms extracted from said molding cavities; said cooling housings being adapted to remove by conduction a first amount of thermal energy from said preforms;
and the aforesaid handling and cooling apparatus;
in which the rotatable handling station is configured to rotate from a loading position for cooperating with the extraction plate to an unloading position for releasing the preforms from said retaining and cooling pins,
in which, in said loading position, the retaining and cooling pins of the rotatable handling station are adapted to cooperate with respective cooling housings of the extraction plate to remove, in a step of blowing of air by means of said pins when the aeraulic circuit is in said first circuit configuration, a second amount of thermal energy from said preforms, and then to retain and extract any preforms from said cooling housings in a step of aspirating air through said pins when the aeraulic circuit is in said second circuit configuration.

A further aspect of the invention relates to a process for handling and cooling plastic preforms preformed in the aforesaid injection molding machine, the process comprising, in accordance with claim 15, the following steps:
providing the rotatable handling station in the loading position, arranged facing the extraction plate containing at least one set of preforms in the respective cooling housings, and providing the aeraulic circuit in said first circuit configuration;
inserting the retaining and cooling pins of the rotatable handling station in the respective cooling housings and further cooling the preforms contained in the latter by means of blowing air through said pins;
switching the aeraulic circuit, by means of said switching means, from said first circuit configuration to said second circuit configuration and aspirating air through the pins to retain the preforms on the rotatable handling station;
disengaging the retaining and cooling pins from the respective cooling housings continuing to aspirate air through the pins;
rotating the rotatable handling station to pass from said loading position to an unloading position continuing to aspirate air through the pins;
switching the aeraulic circuit, by means of said switching means, from said second circuit configuration to said first circuit configuration and blowing air through the pins to release the preforms from said pins.

Advantageously, the apparatus of the invention allows, by virtue of the integration of blowing and aspirating possibilities, to obtain:
both a more efficient cooling of the preforms, performed by means of blowing, by virtue of a better thermal exchange;
and a greater efficiency also in the extraction step, performed by means of aspirating, ensuring an aspirating flow rate which avoids any risk of the preforms falling, once extracted from the extraction plate.

In a first advantageous variation of the invention, said aspiration means consist of a single aspiration means, such as, for example, a fan or a blower or a void pump, interposed between the aspiration duct and the delivery duct of the aeraulic circuit of the apparatus. Such single aspiration means is intended, in a first operation mode, for aspirating air from the inside of the casing of the machine, to be sent in the delivery duct and then, after the cooling by means of the cooling means, for example a heat exchanger or another suitable cooling means, inside the rotatable handling station or "rotary shell"; while, in a second operation mode, the single aspiration means is intended for aspirating air from the inside of the rotatable handling station, to be sent in the delivery duct which releases it, after having it cooled by means of cooling means, inside the casing itself.

The at least one valve associated to the rotatable handling station employs the same aspiration means both for the aspiration and for the delivery. The cooling of the preforms occurs by blowing while the extraction occurs by aspirating. A better heat exchange is obtained by taking advantage of the delivery curve of the fan or of the blower, and not of that of the aspiration, which is 10-20% greater (shifted towards the top on the Cartesian plane Q [m$^3$/h]–p[Pa]). The extraction force remains unchanged.

A second advantageous variation of the invention provides, instead, first aspiration means at an end of the aspiration duct and second aspiration means at an end of the delivery duct. The first aspiration means are intended, in a first operation mode, for aspirating air from the inside of the casing of the machine, to be simply sent back in the casing; while, in a second operation mode, they are intended for aspirating air from the inside of the rotatable handling station, to be sent back in the casing. The second aspiration means, instead, are intended, in said first operation mode, for aspirating air from the inside of the casing to be sent in the delivery duct and then, after the cooling by means of the cooling means, inside the rotatable handling station; while, in said second operation mode, they are intended for aspirating air from the inside of the casing, to be simply sent back in the casing after having it cooled by means of the cooling means.

Said cooling means, for example a heat exchanger of the air-water type, allow to cool the air at a temperature of approximately 10-15° C.

The dependent claims describe preferred embodiments of the invention.

BRIEF DESCRIPTION OF THE FIGURES

Further features and advantages of the invention will become more apparent in light of the detailed description of preferred, but not exclusive, embodiments of an apparatus for cooling and handling preforms shown by way of explanation and not by way of limitation, with the aid of the accompanying figures, in which:

FIG. 2a shows a perspective view of a first embodiment of the apparatus in accordance with the invention in a first operating step;

FIG. 2b shows an enlargement of part of FIG. 2a;

FIG. 3a shows a perspective view of the apparatus of FIG. 2a in a second operating step;

FIG. 3b shows an enlargement of part of FIG. 3a;

FIG. 4b shows an enlargement of part of FIG. 4a;

FIG. 5b shows an enlargement of part of FIG. 5a;

FIG. 6b shows an enlargement of part of FIG. 6a;

FIGS. 10a and 10b show an aeraulic circuit diagram of a first variation of a second embodiment of the apparatus of the invention in two different operation modes;

FIGS. 11a and 11b show an aeraulic circuit diagram of a second variation of said second embodiment of the apparatus of the invention in two different operation modes;

FIGS. 12a and 12b show sectional views of a component of the apparatus in accordance with the invention in two different positions.

The same reference numbers in the Figures identify the same elements or components.

DETAILED DESCRIPTION OF EMBODIMENTS OF THE INVENTION

Figure 1A:
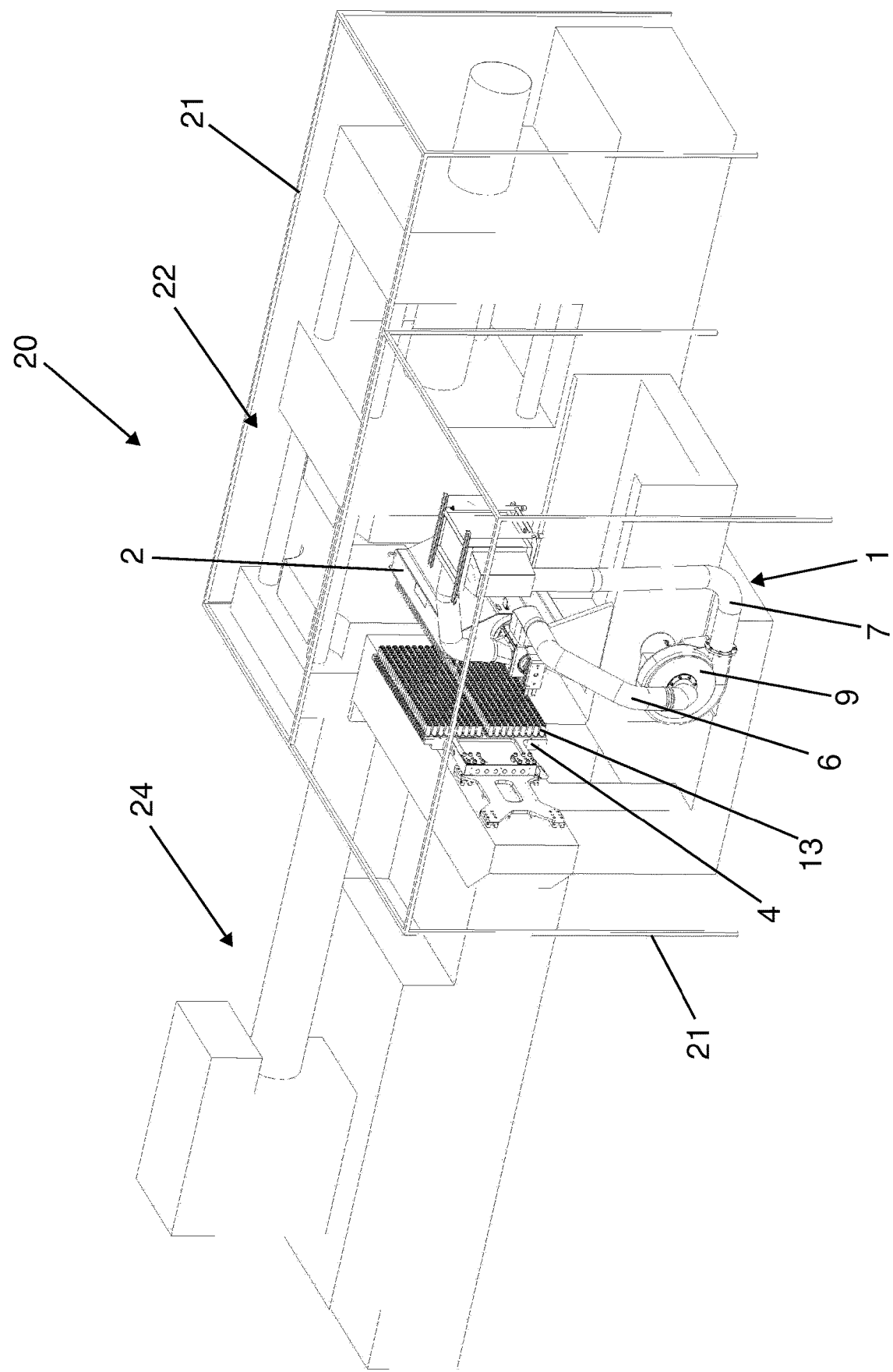
FIG. 1a shows a perspective view of an injection molding machine which includes an apparatus in accordance with the invention.
Figure 1B:
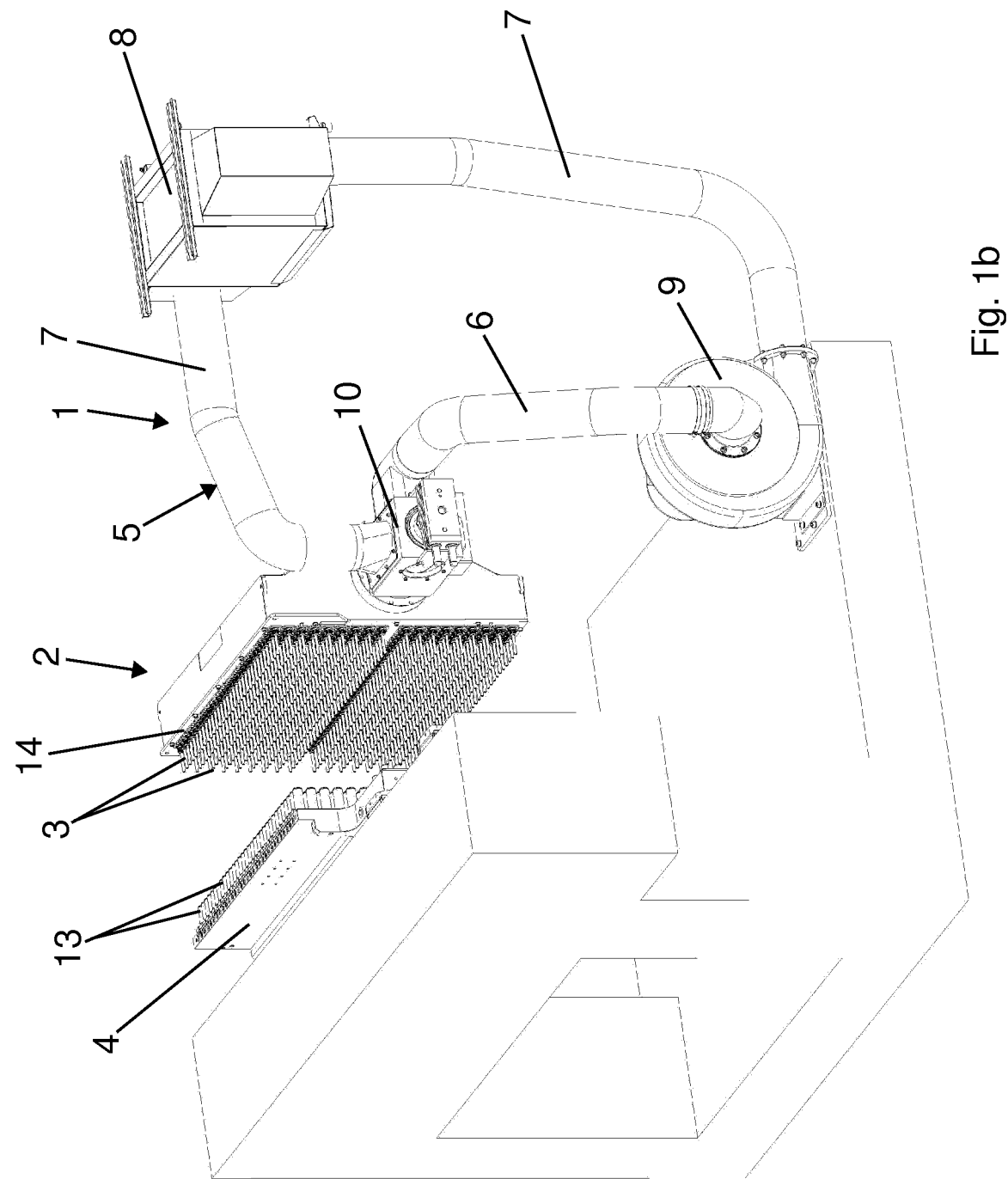
FIG. 1b shows a perspective view of part of the machine of FIG. 1a which includes the apparatus in accordance with the invention.

With reference to FIG. 1a, an injection molding machine is shown comprising the apparatus for cooling and handling preforms in accordance with the invention.

Such injection molding machine 20 comprises a casing 21 inside of which there are provided at least:
- at least one injection mold 22 comprising a plurality of molding cavities;
- an injection unit 24 for injecting melted plastic in the injection mold 22 filling said molding cavities;
- at least one extraction plate 4 comprising at least one set of cooling housings 13, for receiving and retaining at least one set of preforms, extracting them from said molding cavities 23 in a known manner; said cooling housings 13 being configured to perform a first cooling of the preforms following the extraction from the mold; and a handling and cooling apparatus 1.

The cooling housings 13, of a more or less tubular or anyways hollow shape, are fastened on a suitable support frame or skeleton of the extraction plate 4, aligned in accordance with two directions of the space, and ordered in rows and columns so as to form a matrix. Inside each cooling housing 13, a seat is obtained with a geometry that reproduces the shape of the outer surface of the preform. Inside each seat, through an insertion opening, a preform to be cooled may be introduced.

The interior space of the frame and of the cooling housings 13 is crossed by a cooling fluid, for example water and/or air, so as to cool the preforms inserted into said housings. A plurality of channels inside both the extraction plate and the housings allows the cooling fluid to run through a suitable route so as to touch and cool the various tubular bodies of the cooling housings.

With reference to FIGS. 1b to 12b, an apparatus in accordance with the invention is provided, for cooling and handling preforms intended for the production of containers, in particular bottles, in thermoplastic material such as PET, PEN, PP, PLA or other further and suitable material, as well as mixtures thereof, by means of subsequent blow molding or stretch blow-molding of preheated preforms.

Such apparatus 1 for cooling and handling preforms comprises:
- a rotatable handling station or "rotary shell" 2, provided on at least one face 14 with a plurality of nozzles or tips or pins 3 for retaining and cooling the preforms, and adapted to cooperate with the extraction plate 4;
- an aeraulic circuit 5 connected to the rotatable handling station 2.

As the cooling housings 13 in the extraction plate 4, also the retaining and cooling pins 3 are fastened at the face 14 of the rotatable handling station 2, aligned in accordance with two directions in the space, and ordered in rows and columns so as to form a matrix.

Said pins 3 are communicating with an internal volume of the rotatable handling station 2, in turn communicating with the aeraulic circuit 5.

The aeraulic circuit 5 comprises:
- an aspiration duct 6 for aspirating air from the internal volume of the rotatable handling station 2;
- a delivery duct 7 for sending air to said internal volume;
- and aspiration means 9, 19, 29 connected to the aspiration duct 6 and to the delivery duct 7.

The internal volume of the rotatable handling station 2 is defined by a single volume or space, communicating on one side with the aeraulic circuit 5 and on the other side with all the pins 3. From the side of the aeraulic circuit 5 the air may only be introduced in said single volume by means of the delivery duct 7, on the outside of the rotatable handling station 2, with air consequently blowing through all of the pins 3; or the air may be only aspirated by said single volume by means of the aspiration duct 6, also on the outside of the rotatable handling station 2, this aspiration determining the air passage from all of the pins 3 to the internal volume.

Advantageously, cooling means are provided, for example a heat exchanger 8, arranged along the delivery duct 7 to cool the air sent to the rotatable handling station 2.

A further advantage is given by the fact that switching means of the aeraulic circuit are provided for, to pass from a first circuit configuration, in which there is an air passage from the delivery duct 7 to the inside of the rotatable handling station 2, to a second circuit configuration, in which there is an air passage from the inside of the rotatable handling station 2 to the aspiration duct 6, whereby, in the first circuit configuration, air can be blown through all the pins of the plurality of retaining and cooling pins 3, while, in the second circuit configuration, air can be aspirated through all the pins of said plurality of pins 3.

Said switching means of the aeraulic circuit comprise at least one valve 10, 30, 31 and actuating means 11 adapted to actuate said at least one valve.

Advantageously, the actuating means 11 which actuate the at least one valve 10, 30, 31 are independent from the actuating means 12 (FIG. 9) which actuate the rotation of the rotatable handling station 2, allowing to select the blowing or aspirating mode independently of the position and of the movement of the rotatable handling station 2.

The rotatable handling station 2 is configured, in turn, to rotate from a loading position for cooperating with the extraction plate 4 to an unloading position for releasing the preforms from said retaining and cooling pins 3.

In the loading position, the face 14 is arranged parallel to the extraction plate 4 and the retaining and cooling pins 3 are adapted to cooperate with respective cooling housings 13. By approaching the extraction plate 4 and the face 14, the pins 3 are inserted in the preforms arranged in the cooling housings 13 to perform, in an air blowing step when the aeraulic circuit is in the first circuit configuration, a second cooling of the preforms, and then to retain and extract the preforms from said cooling housings 13 in a step of aspirating air when the aeraulic circuit is in the second circuit configuration.

The aspiration means are adapted to aspirate air from the internal environment of the casing 21 in the first circuit configuration, while they are adapted to aspirate air from the inside of the rotatable handling station 2 in the second circuit configuration.

A first embodiment of the apparatus in accordance with the invention, shown in Figures from 1b to 9, provides for only one valve 10, for example a rotatable valve or a linear movement valve, associated with the rotatable handling station 2 and configured so as to pass from a first position, in which the valve 10 allows the air passage from the delivery duct 7 to the inside of the rotatable handling station 2, to a second position, in which the valve 10 allows the air passage from the inside of the rotatable handling station 2 to the aspiration duct 6, whereby, in the first position, air can be blown through the plurality of retaining and cooling pins 3, while, in the second position, air can be aspirated through said plurality of pins 3. The valve 10 is connected to the shell of the rotatable handling station 2 and respective ends of the delivery duct 7 and of the aspiration duct 6 are connected thereto.

Figure 8:
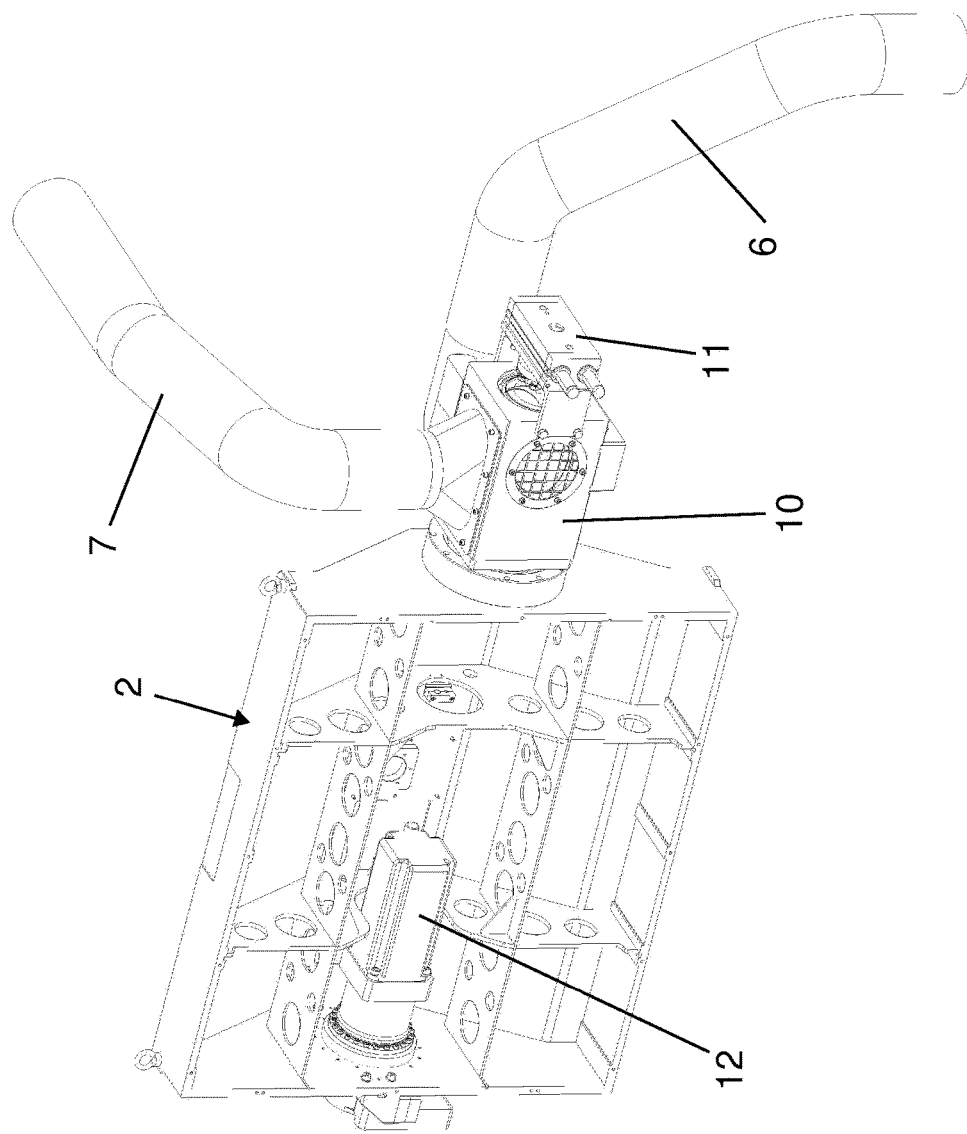
FIG. 8 shows a perspective view of a number of components of the apparatus in accordance with the invention.
Figure 7:
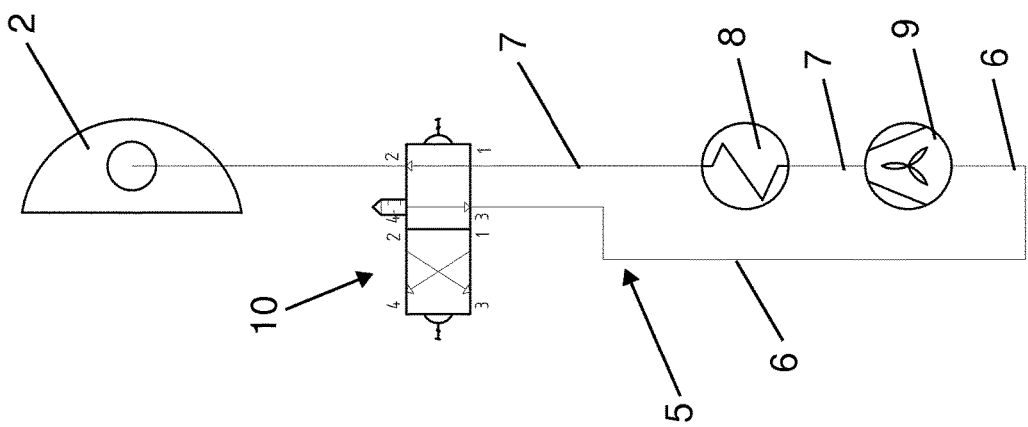
FIG. 7 shows a diagram of the aeraulic circuit of the apparatus in accordance with said first embodiment of the apparatus of the invention.

A rotatable valve 10 is shown, for example, in FIGS. 8, 12a and 12b.

The body of the rotatable valve 10 comprises two ducts: one duct 40 defining a first rectilinear axis, and one duct 41 comprising two segments 42, 43 connected by an L-pipe 44. Duct 40 and duct 41 are independent from one another, i.e. they are not communicating. The segment 42 defines a respective second rectilinear axis and the segment 43 defines a respective third rectilinear axis, second axis and third axis being substantially orthogonal to one another and also with respect to the first axis of the duct 40.

Therefore, when the actuating means 11 rotate the body of the rotatable valve, for example by approximately 90°, the valve 10 passes:

from the configuration of FIG. 12a, corresponding to the aforesaid first position, where the duct 41 puts into communication the delivery duct 7 with the rotatable handling station 2 (blowing step for cooling the preforms), while the duct 40 puts into communication the aspiration duct 6 with the internal environment of the casing 21;

to the configuration of FIG. 12b, corresponding to the aforesaid second position, where the duct 40 puts into communication the delivery duct 7 with the internal environment of the casing 21; while the duct 41 puts into communication the rotatable handling station 2 with the aspiration duct 6 (aspirating step for retain the preforms).

With reference to Figures from 2a to 8b, a first variation of this first embodiment with a single valve 10 is shown.

In this first variation, the aspiration means 9 are interposed between the aspiration duct 6 and the delivery duct 7 so as to aspirate air from the aspiration duct 6 and to introduce it into the delivery duct 7. Aspiration duct 6 and delivery duct 7 are therefore in communication by means of said aspiration means 9.

In particular, in this first variation, the aspiration means 9 may consist of a single fan or blower configured to aspirate air from the internal environment of the casing 21 when the valve 10 is in the first position, while is adapted to aspirate air from the inside of the rotatable handling station 2 when the valve 10 is in the second position.

Advantageously, the aspiration means 9 have a flow rate of at least 15 m$^3$/min, preferably from 15 to 80 m$^3$/min, even more preferably from 60 to 80 m$^3$/min, to avoid the collapse of the void inside the rotary shell 2, in particular when, during the coupling of the face 14 and the extraction plate 4, a number of columns of cooling housings 13 are empty and do not contain preforms therewithin.

Figure 9:
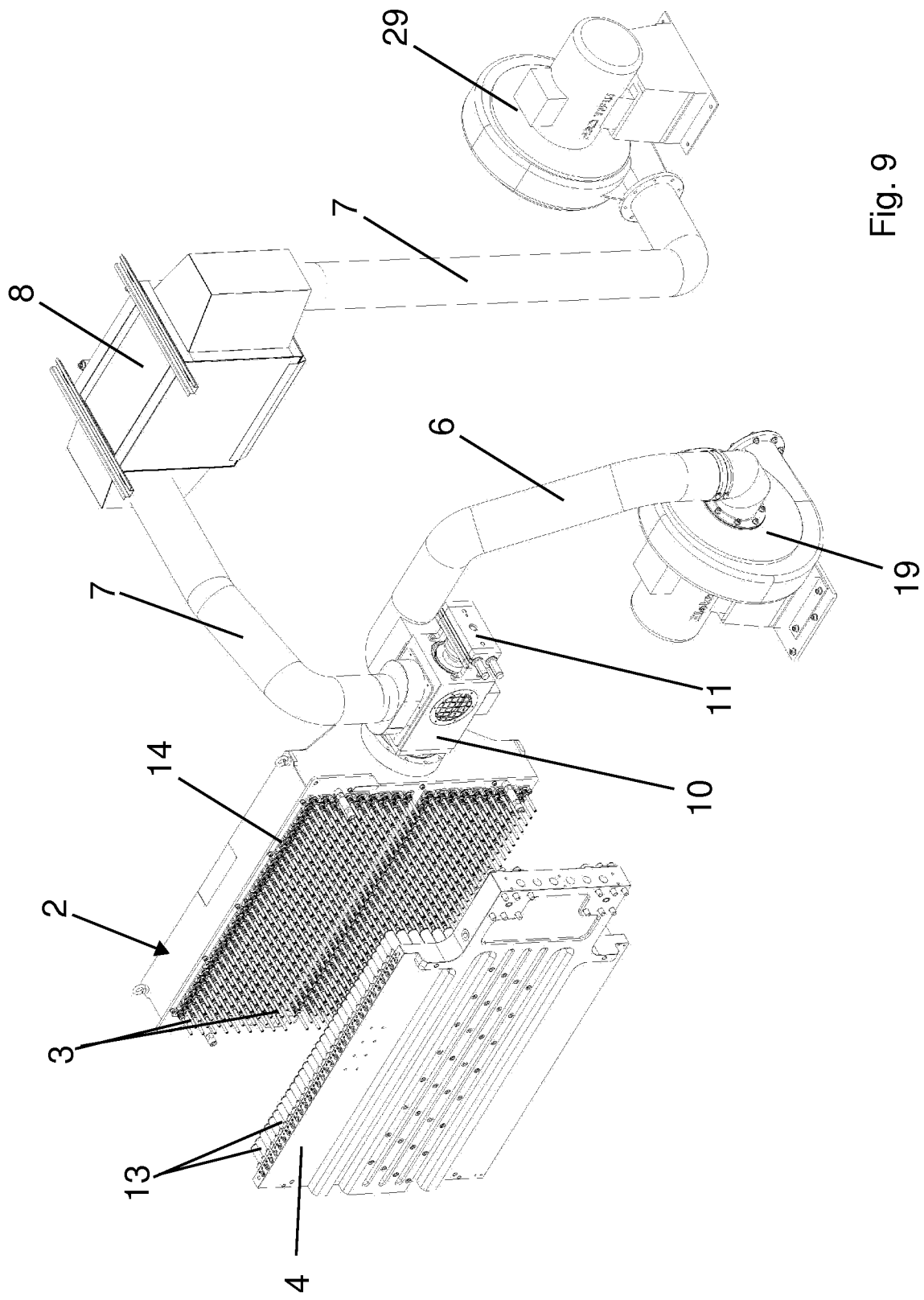
FIG. 9 shows a perspective view of a variation of said first embodiment of the apparatus in accordance with the invention.

With reference to FIG. 9, a second variation of this first embodiment with a single valve 10 is shown.

In this second variation, the aspiration duct 6 and the delivery duct 7 are not communicating, and first aspiration means 19 are provided at an end of the aspiration duct 6 and second aspiration means 29 are provided at an end of the delivery duct 7, said ends being distal from the rotatable handling station 2.

In particular, the first aspiration means 19 may consist of a first fan or blower configured to aspirate air from the internal environment of the casing 21 when the valve 10 is in the first position, while is adapted to aspirate air from the inside of the rotatable handling station 2 when the valve 10 is in the second position. The second aspiration means 29 may consist of a second fan or blower, configured to aspirate air from the internal environment of the casing 21 to send it in the delivery duct 7, and subsequently to the rotatable handling station 2 when the valve 10 is in the first position, or again in the internal environment of the casing 21 after cooling the air aspirated by means of the cooling means 8.

The first fan, as the fan of the first variation, has a flow rate of at least 15 m$^3$/min, preferably from 15 to 80 m$^3$/min, even more preferably from 60 to 80 m$^3$/min; while the second fan 29 has a flow rate of approximately 15-200 m$^3$/min, preferably from 60 to 200 m$^3$/min.

Figure 4A:
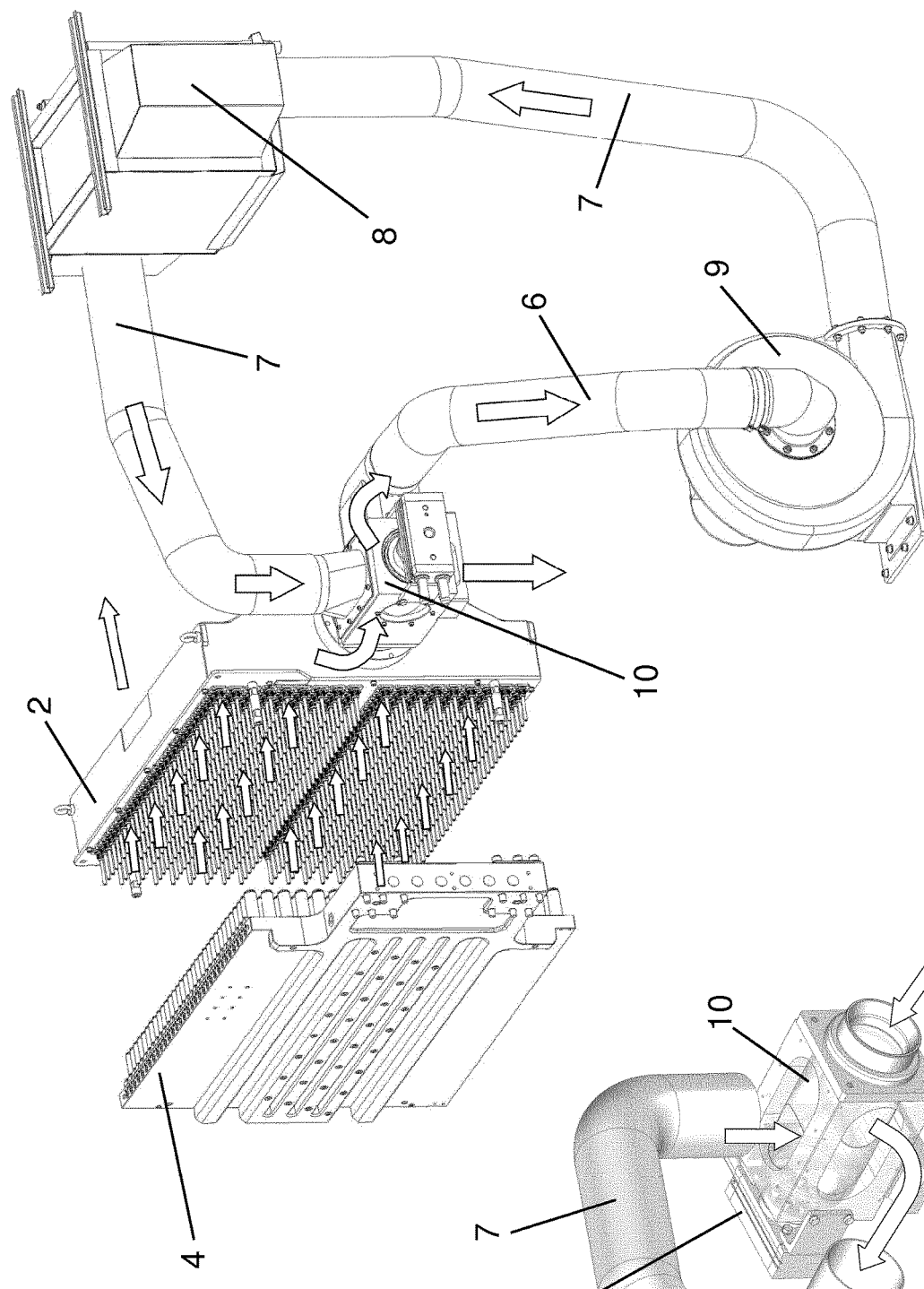
FIG. 4a shows a perspective view of the apparatus of FIG. 2a in a third operating step.
Figure 4B:
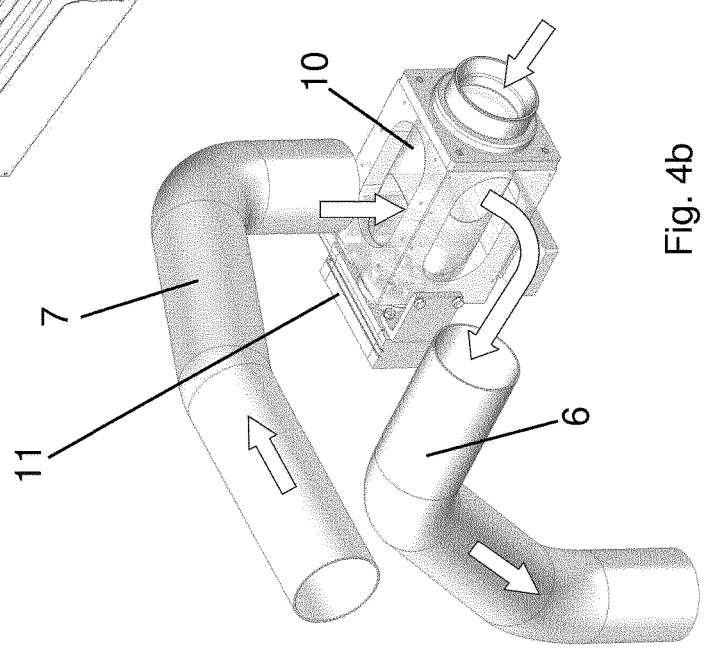
Figure 5A:
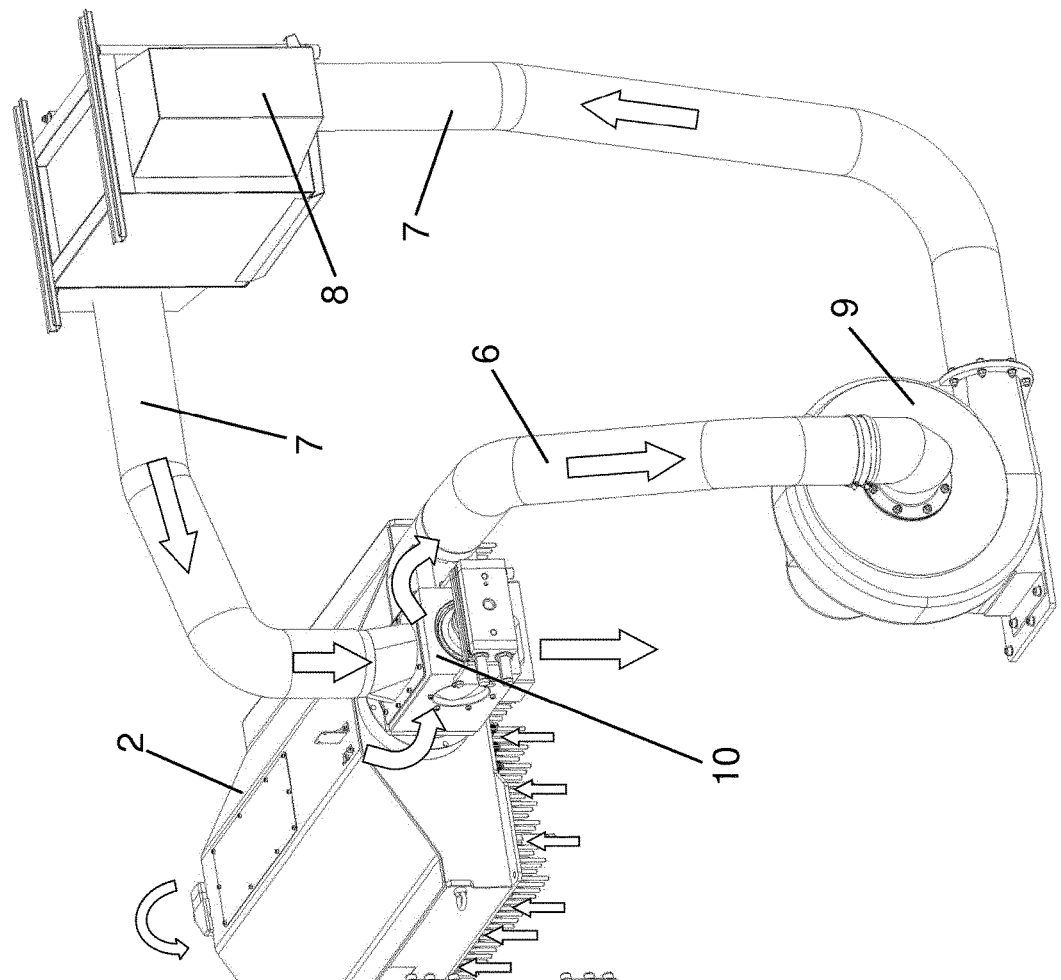
FIG. 5a shows a perspective view of the apparatus of FIG. 2a in a fourth operating step.
Figure 5B:
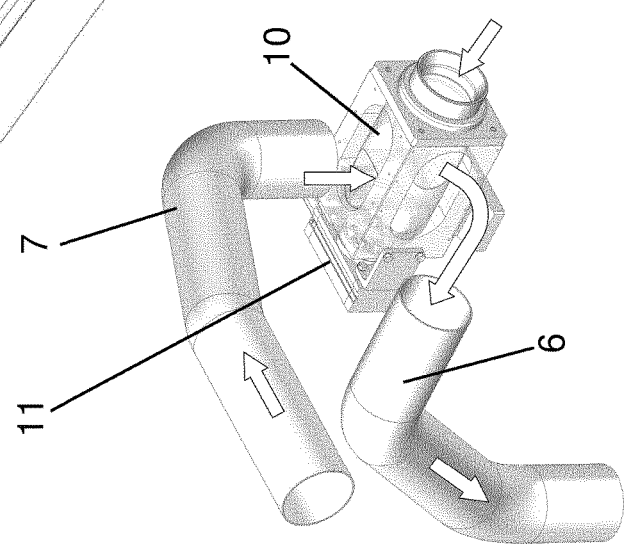
Figure 6A:
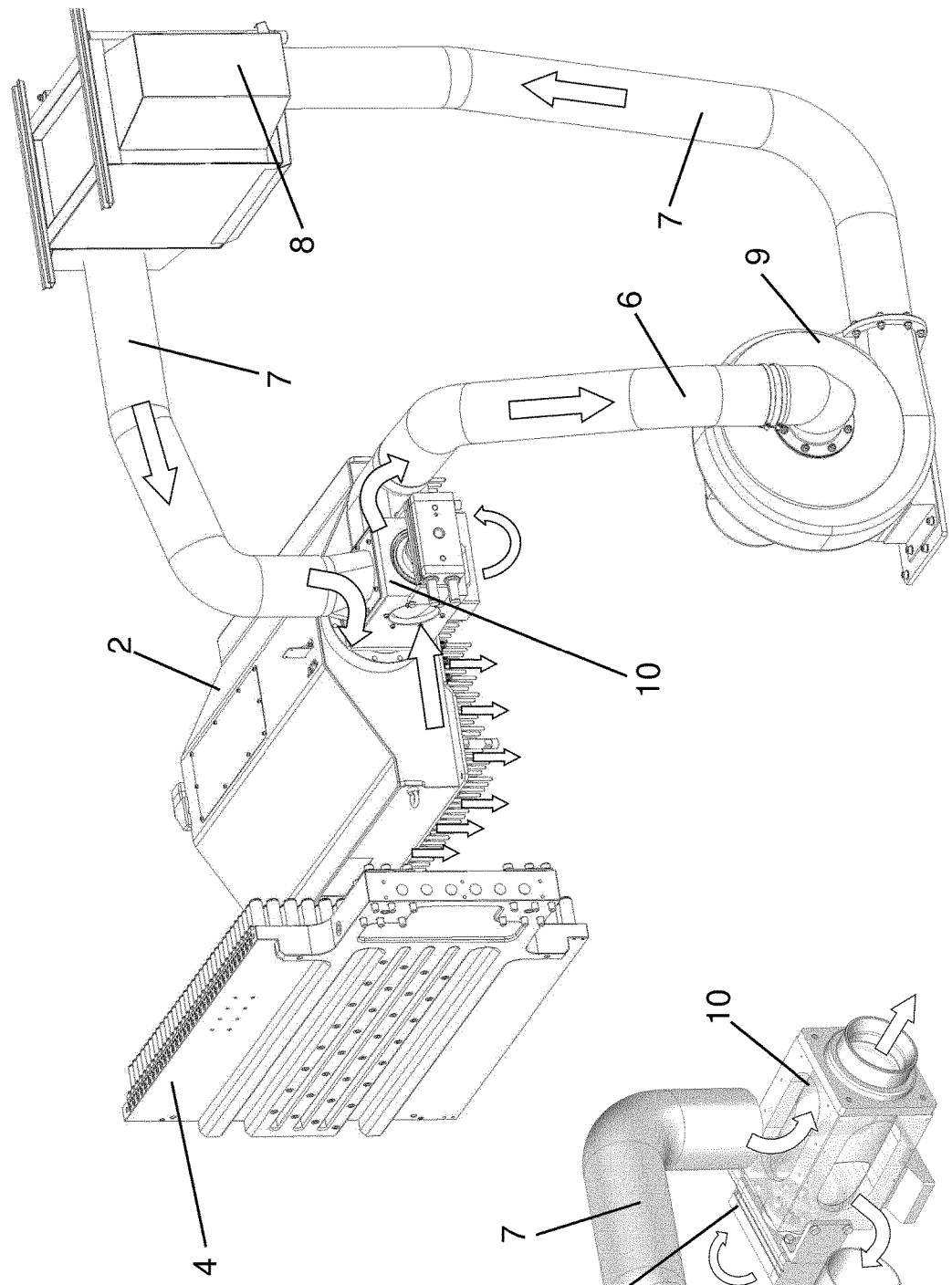
FIG. 6a shows a perspective view of the apparatus of FIG. 2a in a fifth operating step.
Figure 6B:
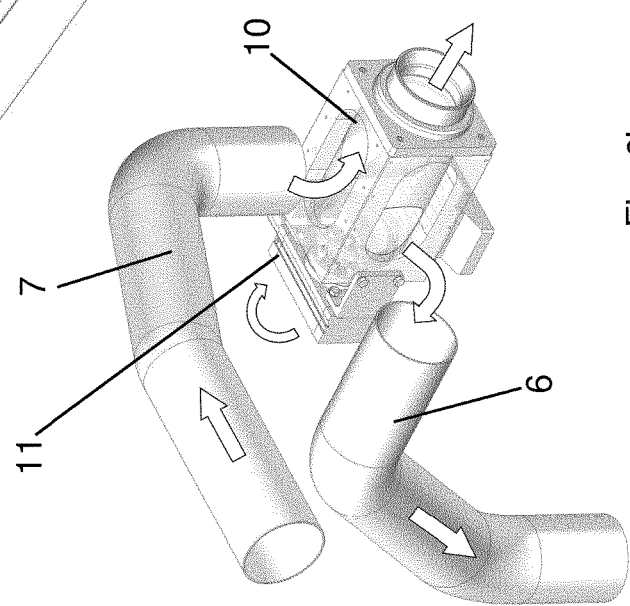

The process for handling and cooling plastic preforms in the injection molding machine described above, considering the first embodiment of the invention, comprises the following steps:

providing the rotatable handling station 2 in the loading position (FIG. 1b) and the valve 10 in the first position, i.e. the blowing position;

inserting the retaining and cooling pins 3 in the respective cooling housings 13 and cooling the preforms contained in the latter by means of blowing air through said pins 3 (FIGS. 2a and 2b);

actuating the valve 10, by means of the actuating means 11, to pass from the first position to the second position, i.e. to the aspirating position, and aspirating air through the pins 3 to retain the preforms on the rotatable handling station 2 (FIGS. 3a and 3b);

disengaging the retaining and cooling pins 3 from the respective cooling housings 13 continuing to aspirate air through the pins 3 (FIGS. 4a and 4b);

rotating the rotatable handling station 2, by means of the actuating means 12, to pass from the loading position to an unloading position continuing to aspirate air through the pins 3 (FIGS. 5a and 5b);

actuating the valve 10, by means of the first actuating means 11, to pass from said second position to said first position and blowing air through the pins 3 to release the preforms from the pins (FIGS. 6a and 6b).

A second embodiment of the apparatus in accordance with the invention, shown in FIGS. 10a and 10b, provides instead for at least two valves: a valve 30 is arranged in the delivery duct 7 downstream the cooling means 8, and a valve 31 is arranged in the aspiration duct 6 upstream the aspiration means 9.

In this second embodiment, the actuating means 11 (not shown in FIGS. 10a and 10b) are adapted to open alternatively the valve 30 and the valve 31, whereby, when the valve 30 is open, the valve 31 is closed (FIG. 10b) and the air passage is permitted from the delivery duct 7 to the inside of the rotatable handling station 2 (blowing step for cooling the preforms), while when the valve 31 is open, the valve 30 is closed (FIG. 10a) and the air passage is permitted from the inside of the rotatable handling station 2 to the aspiration duct 6 (aspirating step for retaining the preforms on the station 2).

With reference to FIGS. 10a and 10b, a first variation of this second embodiment with two valves 30, 31 is shown.

In this first variation, the aspiration means 9 are interposed between the aspiration duct 6 and the delivery duct 7 so as to aspirate air from the aspiration duct 6 and to introduce it into the delivery duct 7. Aspiration duct 6 and delivery duct 7 are therefore in communication by means of said aspiration means 9.

In particular, the aspiration means 9 may consist of a single fan or blower configured to aspirate air from the internal environment of the casing 21 when the valve 31 is in the position of FIG. 10b, while is adapted to aspirate air from the inside of the rotatable handling station 2 when the valve 31 is in the position of FIG. 10a.

Advantageously, the aspiration means 9 have a flow rate of at least 15 m$^3$/min, preferably from 15 to 80 m$^3$/min, even more preferably from 60 to 80 m$^3$/min, to avoid the collapse of the void inside the rotary shell 2, in particular when, during the coupling of the face 14 and the extraction plate 4, a number of columns of cooling housings 13 are empty and do not contain preforms therewithin.

Also for this second embodiment with two valves a second variation may be provided, shown in FIGS. 11a and 11b, wherein the aspiration duct 6 and the delivery duct 7 are not communicating, and first aspiration means 19 are provided at an end of the aspiration duct 6 and second aspiration means 29 are provided at an end of the delivery duct 7, said ends being distal from the rotatable handling station 2.

In particular, the first aspiration means 19 may consist of a first fan or blower configured to aspirate air from the internal environment of the casing 21 when the valve 31 assumes the position of FIG. 11b, while is adapted to aspirate air from the inside of the rotatable handling station 2 when the valve 31 assumes the position of FIG. 11a. The second aspiration means 29 may consist of a second fan or blower, configured to aspirate air from the internal environment of the casing 21 to send it in the delivery duct 7, and, subsequently, to the rotatable handling station 2 when the valve 30 assumes the position of FIG. 11b, or in the internal environment of the casing 21 itself, after cooling the air aspirated by means of the cooling means 8, when the valve 30 assumes the position of FIG. 11a.

Also in this second variation of the second embodiment, the first fan, as the fan of the first variation, has a flow rate of at least 15 m$^3$/min, preferably from 15 to 80 m$^3$/min, even more preferably from 60 to 80 m$^3$/min; while the second fan has a flow rate of approximately 15-200 m$^3$/min, preferably from 60 to 200 m$^3$/min.

The process for handling and cooling plastic preforms in the injection molding machine described above, considering the second embodiment of the invention, comprises the following steps:

providing the rotatable handling station 2 in the loading position, the valve 30 open and the valve 31 closed, i.e. the blowing position (FIG. 10b);

inserting the retaining and cooling pins 3 in the respective cooling housings 13 and cooling the preforms contained in the latter by means of blowing air through said pins 3;

closing the valve 30 and opening the valve 31, by means of the respective actuating means, to pass from the first circuit configuration to the second circuit configuration, i.e. the aspirating one, and aspirating air through the pins 3 to retain the preforms on the rotatable handling station 2 (FIG. 10a);

disengaging the retaining and cooling pins 3 from the respective cooling housings 13 continuing to aspirate air through the pins 3;

rotating the rotatable handling station 2, by means of the actuating means 12, to pass from the loading position to an unloading position continuing to aspirate air through the pins 3;

reopening the valve 30 and reclosing the valve 31, by means of the respective actuating means, to pass from said second circuit configuration to said first circuit configuration (FIG. 10b), i.e. the blowing one, and blowing air through the pins 3 to release the preforms from the pins.

The invention claimed is:

1. An apparatus for handling and cooling plastic preforms comprising:

a rotatable handling station provided with a plurality of retaining and cooling pins for preforms and adapted to cooperate with an extraction plate adapted to extract the preforms from an injection mold;

an aeraulic circuit connected to said rotatable handling station, said aeraulic circuit comprising:

an aspiration duct for aspirating air from inside the rotatable handling station;

a delivery duct for sending air to said rotatable handling station;

a cooler arranged along said delivery duct for cooling the air sent to said rotatable handling station; and an aspirator connected to said aspiration duct and to said delivery duct;

wherein the aeraulic circuit is operative to switch between a first circuit configuration, in which air is permitted to flow from the delivery duct to the rotatable handling station, and a second circuit configuration, in which air is permitted to flow from the rotatable handling station to the aspiration duct, such that when the aeraulic circuit is switched to the first circuit configuration, the plurality of retaining and cooling pins are operative to blow air therethrough, and when the aeraulic circuit is switched to the second circuit configuration, the plurality of retaining and cooling pins are operative to aspirate air therethrough; and a valve actuatable to switch the aeraulic circuit between the first and second circuit configurations via the valve being configured to transition between a first and a second position, wherein when the valve is transitioned to the first position, the valve places the delivery duct in fluid communication with the rotatable handling station and prevents the aspiration duct from being in fluid communication with the rotatable handling station, and when the valve is transitioned to the second position, the valve places the aspiration duct in fluid communication with the rotatable handling station and prevents the delivery duct from being in fluid communication with the rotatable handling station;

wherein a body of the valve comprises a first duct and a second duct independent from one another;

wherein, when the valve is transitioned to the first position, the first duct puts the delivery duct into communication with the rotatable handling station while the second duct puts the aspiration duct into communication with an internal environment of a casing of said apparatus; and wherein, when the valve is transitioned to the second position, the second duct puts the delivery duct into communication with the internal environment of the casing while the first duct puts the rotatable handling station into communication with the aspiration duct.

2. The apparatus according to claim 1, wherein the rotatable handling station is rotatable between a preform loading position and a preform unloading position independent of actuation of the valve between the first and second positions.

3. The apparatus according to claim 1, wherein said aspirator is interposed between the aspiration duct and the delivery duct so as to aspirate air from the aspiration duct and introduce it into the delivery duct.

4. The apparatus according to claim 1, wherein the aspirator has a flow rate of at least 15 m$^3$/min.

5. The apparatus according to claim 1, wherein said valve is either a rotatable valve or a linear movement valve.

6. A method of operating an injection molding machine, the method comprising the steps of:

providing the apparatus for handling and cooling plastic preforms as recited in claim 1;

providing at least one injection mold comprising a plurality of molding cavities, and at least one extraction plate comprising at least one set of cooling housings adapted to retain at least one set of preforms extracted from said molding cavities, said at least one set of cooling housings being adapted to remove by conduction a first amount of thermal energy from said preforms; and rotating the rotatable handling station between a loading position and an unloading position;

wherein in the loading position, the retaining and cooling pins of the rotatable handling station are operative to cooperate with said at least one set of cooling housings of the extraction plate to remove a second amount of thermal energy from said preforms via the aeraulic circuit being transitioned to the first circuit configuration and the plurality of retaining and cooling pins having air blown therethrough, with the retaining and cooling pins being further operative to retain and extract the preforms from said at least one set of cooling housings via the aeraulic circuit being transitioned to the second circuit configuration and the plurality of retaining and cooling pins having air aspirated therethrough; and wherein when rotated to the unloading position, the retaining and cooling pins are operative to release the preforms.

7. The method according to claim 6, wherein when the aeraulic circuit is in the first circuit configuration, the aspirator is adapted to aspirate air from an internal environment of a casing containing at least the apparatus for handling and cooling plastic preforms, the at least one injection mold, and the at least one extraction plate, and wherein when the aeraulic circuit is in said second circuit configuration, the aspirator is adapted to aspirate air from the inside of the rotatable handling station.

8. The method according to claim 7, wherein the aspirator is interposed between the aspiration duct and the delivery duct so as to aspirate air from the aspiration duct and to introduce it into the delivery duct.

9. The method according to claim 6, wherein the aspiration duct and the delivery duct are not in fluid communication, wherein a first aspirator is provided at an end of the aspiration duct and second aspirator is provided at an end of the delivery duct, wherein the first aspirator is adapted to aspirate air from an internal environment of a casing containing at least the apparatus for handling and cooling plastic preforms, the at least one injection mold, and the at least one extraction plate when the aeraulic circuit is in the first circuit configuration and to aspirate air from the inside of the rotatable handling station when the aeraulic circuit is in the second configuration, and wherein the second aspirator is adapted to aspirate air from the internal environment of the casing to send it into the delivery duct.

* * * * *